United States Patent [19]

Schneider et al.

[11] 4,343,983

[45] Aug. 10, 1982

[54] NON-CONSUMABLE COMPOSITE WELDING ELECTRODE

[75] Inventors: Urban A. Schneider, St. Petersburg; Robert L. Nelson, Tampa, both of Fla.

[73] Assignee: Westinghouse Electric Corp., Pittsburgh, Pa.

[21] Appl. No.: 77,209

[22] Filed: Sep. 20, 1979

[51] Int. Cl.³ .................... B23K 35/04; B23K 35/32
[52] U.S. Cl. ........................ 219/145.21; 219/146.21
[58] Field of Search ....................... 219/145.21, 146.21

[56] References Cited

U.S. PATENT DOCUMENTS

| 2,010,605 | 8/1935 | Miller | 428/685 X |
| 2,462,463 | 2/1949 | Boot | 219/145.21 X |
| 2,794,898 | 6/1957 | Gibson | 219/145.21 X |
| 3,610,877 | 10/1971 | Driscoll | 219/145.21 |

FOREIGN PATENT DOCUMENTS 2437776  2/1976  Fed. Rep. of Germany ...................... 219/146.21

OTHER PUBLICATIONS

*Welding Handbook*, Sixth Edition, Section Two, "Welding Processes:" Gas, Arc and Resistance; American Welding Society, N.Y., 1969, Chapter 29–Thermal Spraying.

*Primary Examiner*—J. V. Truhe
*Assistant Examiner*—Keith E. George
*Attorney, Agent, or Firm*—Daniel C. Abeles

[57] ABSTRACT

An improved tungsten inert gas-shielded non-consumable composite welding electrode having a solid tungsten rod center (12) and a concentric outer sleeve (14) substantially lower in electrical resistivity than the tungsten rod, bonded adhesively and cohesively to the tungsten by flame spraying so that the surface irregularities of the mating surface areas of the tungsten and outer sleeve mechanically interlock. The improvement is provided by coating the outer sleeve onto the tungsten center and adhesively and cohesively bonding the interface of the surface area of contact to maintain a minimum resistance electric coupling at welding operating temperatures.

5 Claims, 3 Drawing Figures

U.S. Patent  Aug. 10, 1982  4,343,983
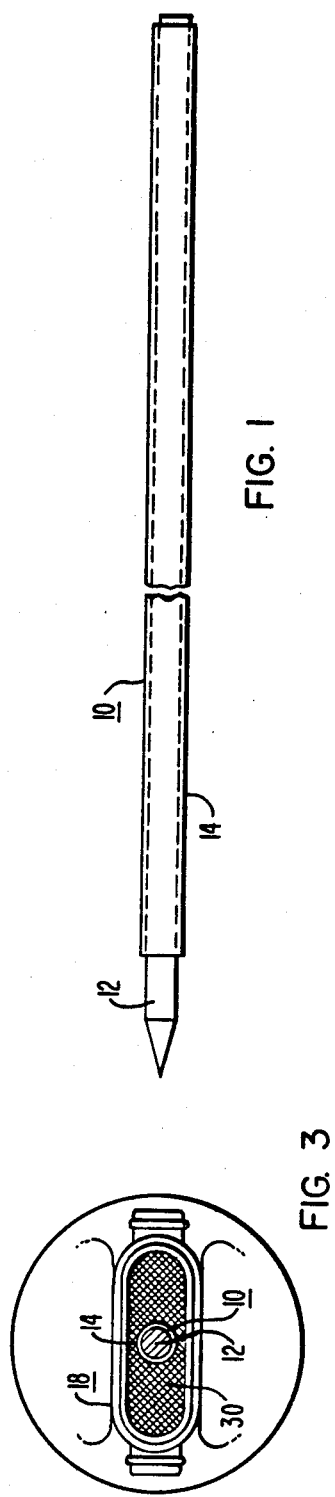
FIG. 1
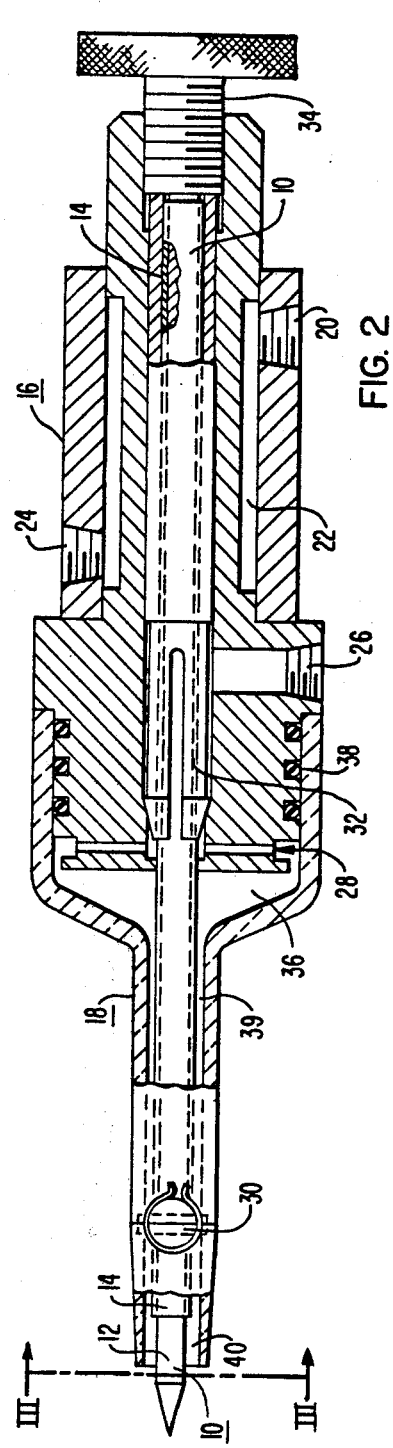
FIG. 2
FIG. 3

NON-CONSUMABLE COMPOSITE WELDING ELECTRODE

BACKGROUND OF THE INVENTION

This invention pertains generally to nonconsumable welding electrodes and more particularly to nonconsumable, composite electrodes designed for use with gas tungsten arc welding torches.

Gas tungsten arc welding processes achieve coalescence by heating the weld zone with an arc struck between a tungsten electrode and the workpiece. To prevent oxidation the heated weld zone, the molten metal and the non-consumable electrode are shielded from the atmosphere by an inert gas stream which is directed from the electrode holder, commonly referred to as the welding torch.

Most commercial torch designs employ a collet for supporting and transferring weld current to the tungsten electrode. The electrode generally extends from the collet, axially through a surrounding gas nozzle and projects a short distance beyond the nozzle orifice. The shield gas is conveyed through the nozzle, along the electrode and out the orifice to the weld. U.S. Pat. No. 2,794,898 noted that the current carrying capacity of a tungsten electrode is limited by the amount of resistance heat generated by the conductance of weld current through the electrode and the heat radiated from the arc. The prior art proposed the use of thoriated tungsten to increase the emissability (efficiency) of the electrode for a given amperage and thus enable a reduction in applied amperage to reduce the heating effects of the electrode and improved water cooling to dissipate the heat in the electrode to increase the electrodes current carrying capacity. The above-noted patent recognized further that the electrode itself was a major source of heat which led to the electrodes failure and limited its current carrying capability. The patent proposed a composite electrode having a central tungsten core and an outer copper sheath swaged to the tungsten. The copper sheath was employed as a low resistance current carrier to transport the weld current from the collet to the tungsten weld tip. The addition of the copper sheath, initially and under a short extension and low duty cycle, will significantly reduce the heat that would have been otherwise generated along the length of tungsten short circuited by the copper. While the addition of the sheath in theory provided an improvement in some applications, it failed to overcome the damaging effects of electrode heating under a prolonged duty cycle or extended electrode length (long $I^2R$ heat inducing path) typical in narrow groove applications. Experience has shown that under such conditions the difference in coefficients of thermal expansion of the copper and tungsten under welding operating temperatures will result in upsetting the copper sheath fit, heavily oxidizing the interface and substantially reducing the effective conductivity of the copper current path. In deep, narrow grooves, which can extend for example over four inches in depth and have side walls inclined at less than six degrees, the radiant heat from the arc contributes more significantly to the degradation of the electrode. As a result of the severe heating environment of a deep, narrow groove the copper sheath described in Patent 2,794,898 expands away from the tungsten creating an increase in the electrical resistivity of the contact surface area at the tungsten/copper interface. Thus under these conditions a significant portion of the weld current is either redirected through the tungsten or forced to jump the high resistance gap across the copper/tungsten interface. In not having the capability to carry the waste heat of $I^2R$ heating and radiant pickup away from the electrode's tip geometry, that geometry cannot be sustained for any appreciable length of time.

Accordingly, an improved electrode design is desired that will increase the operating life and current carrying capacity of a nonconsumable, tungsten electrode in narrow groove applications.

SUMMARY OF THE INVENTION

Briefly, this invention pertains to an improved tungsten inert gas-shielded welding electrode (10) and a torch arrangement incorporating such an electrode. The electrode is formed from a solid tungsten rod (12) having a concentric outer sleeve (14) substantially lower in electrical resistivity than the tungsten rod. The sleeve is adhesively and cohesively bonded to the tungsten by thermal spraying so that the surface irregularities of the mating surface areas of the tungsten and outer sleeve mechanically interlock.

BRIEF DESCRIPTION OF THE DRAWINGS

For a better understanding of the invention, reference may be had to the preferred embodiment, exemplary of the invention, shown in the accompanying drawings, in which:

FIG. 1 is a side elevation view of the improved welding electrode of this invention;

FIG. 2 is a cross sectional view of a welding torch incorporating the electrode of this invention;

FIG. 3 is a cross sectional view taken along lines III—III of FIG. 2.

DESCRIPTION OF THE PREFERRED EMBODIMENT

In accordance with this invention, as shown in FIGS. 1 to 3, a composite electrode 10 is formed by flame spraying material of low electrical resistivity 14 onto the surface of the tungsten electrode 12. Desirably the low resistivity coating is also designed to have a high thermal conductivity. The high conductivity coating is applied to adhesively and cohesively bond with the tungsten surface so that the surface irregularities of mating surface areas mechanically interlock. Desirably, as is known in the art, an intermediate undercoating is applied to the tungsten surface to enhance adhesion of the outer electrical coating. The flame sprayed bond maintains its low contact resistance between mating surface areas under welding operating temperatures.

The electrode coating is formed from a material such as copper having a substantially lower resistance to electrical conductance than the tungsten center electrode. Experimental results have shown that such a copper coating bonded by flame spraying, a thermal spraying process, provides a signficant improvement in reducing resistance heating effects encountered under welding operating conditions in a deep narrow groove.

Desirably, a coating in the order of 0.03 inches in depth is deposited on the tungsten electrode and extends from the collet 32 to a point below the lower gas diffuser 30 near the gas nozzle orifice 40, as shown in FIG. 2.

FIG. 2 illustrates a weld torch designed for deep narrow groove applications, incorporating the improved electrode of this invention. The main components of the torch include the torch body 16, the gas nozzle 18 and the composite electrode 10. The torch body 16 is constructed from copper and serves as a large heat sink with direct water cooling applied through inlet 20, circulated around the housing through an annular conduit 22 and exhausted at the water outlet port 24. The shield gas is introduced through gas inlet 26 and is directed along the centrally disposed electrode 10 and radially through the gas ports 28 to the inside periphery of the nozzle chamber 36.

The nozzle is formed from an electrical insulating material to isolate the electrode from contact with the side wall of the weld groove. The nozzle also functions to channel the shield gas from the main torch body to the weld puddle in a manner to establish laminar flow and assure satisfactory shield coverage of the weld. The enlarged end of the nozzle is sealed to the torch body 16 by O-rings 38 and the nozzle is tapered at its opposite end to permit full insertion into a deep narrow groove. The tapered interior width 39 of the nozzle is guaged to supply proper clearance for the electrode 10 and establish an annular gas channel to funnel the shield gas to the orifice 40. A diffusion lens arrangement 30 is disposed in the tapered portion of the gas channel, proximate to and upstream of the orifice 40, to create laminar gas flow at the orifice.

The composite electrode 10 of this invention is channeled through the central annulus within the main torch body and is captured and partially supported by the collet 32, which transfers the welding current to the electrode. The knurled nut 34 at the upper extreme of the torch body serves to capture the electrode 10 within the central annulus.

FIG. 3 is a cross sectional view of the composite electrode of this invention taken at the orifice 40 and illustrates the shape and relative size of the tapered gas channel 38 and the electrode 10.

Experimental results, employing a flame sprayed copper coated tungsten welding electrode, with the copper machined to a 0.03 inch diameter and with a $\frac{3}{4}$ to $1\frac{1}{4}$ inch length of tungsten left uncovered at the arc end of the electrode, have shown that the copper maintains intimate electrical contact with the tungsten in a deep narrow groove welding environment and significantly reduces the resistance heating effects on the tungsten. The results become increasingly important where electrode lengths over three inches are employed due to the very high resistance ($I^2R$) power absorption curve of the tungsten. Tungsten electrodes employing either a swaged copper cladding or extended water cooling applied in the same environment have shown significantly greater deterioration than the electrode of this invention. A further advantage of the flame sprayed coating becomes apparent when after a number of electrode tip geometry restorations (by grinding) the base tip length has decreased to less than the $\frac{3}{4}''$ minimum. The excess coating may be easily hand removed back to the $1\frac{1}{4}''$ maximum without damage to the balance of the coating and without residue on the stripped area. The copper coating also serves as a high thermal conductivity path which helps dissipate the radiant heat encountered at the electrode tip, thereby further enhancing the operating life of the electrode.

Accordingly, the improvement of this invention maintains a low resistance electrical conductance path at the copper tungsten boundary in the adverse welding environment of a narrow groove, which significantly reduces the resistance heating effect on the tungsten and notably extends the operating life of the electrode.

We claim as our invention:

1. A tungsten inert gas-shielded, non-consumable welding electrode comprising a solid tungsten rod center and a concentric outer sleeve substantially lower in electrical resistivity than the tungsten rod, adhesively and cohesively bonded to the tungsten by thermal spraying so that the surface irregularities of the mating surface areas of the tungsten and outer sleeve mechanically interlock with some oxide-to-oxide bonding without alloying of the tungsten rod center and sleeve material.

2. The welding electrode of claim 1 wherein the outer sleeve is formed from copper.

3. The welding electrode of claim 1 wherein the outer sleeve is designed to have a substantially higher thermal conductivity than the solid tungsten rod center.

4. The welding electrode of claim 1 wherein the outer sleeve does not extend over the $\frac{3}{4}$ inch to $1\frac{1}{4}$ inch length of tungsten adjacent the arc generating tip of the electrode.

5. A tungsten inert gas-shielded welding torch comprising:
a gas nozzle;
an electrical contactor for transferring welding current affixed at one end of the nozzle; and
an elongated non-consumable welding electrode, over three inches in length, in electrical contact with and extending from the electrical contactor through and beyond the opposite end of the nozzle, wherein the electrode comprises a solid tungsten rod center and a concentric outer sleeve substantially lower in electrical resistivity than the tungsten rod, adhesively and cohesively bonded to the tungsten by thermal spraying so that the surface irregularities of the mating surface areas of the tungsten and outer sleeve mechanically interlock with some oxide-to-oxide bonding without alloying of the tungsten rod center and sleeve material.

* * * * *